United States Patent
Mohler et al.

(10) Patent No.: US 6,928,217 B2
(45) Date of Patent: Aug. 9, 2005

(54) FIBER OPTIC CABLE HAVING A STRENGTH MEMBER

(75) Inventors: James D. Mohler, Kernersville, NC (US); Kenneth F. Dunn, Statesville, NC (US); David A. Seddon, Hickory, NC (US); William S. Jackman, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/623,231

(22) Filed: Jul. 18, 2003

(65) Prior Publication Data

US 2005/0013565 A1 Jan. 20, 2005

(51) Int. Cl.⁷ .................................................. G02B 6/44
(52) U.S. Cl. ...................................................... 385/113
(58) Field of Search ................................ 385/100, 102, 385/103, 113

(56) References Cited

U.S. PATENT DOCUMENTS

| | | | |
|---|---|---|---|
| 4,467,138 A | 8/1984 | Brorein ........................ 174/115 |
| 4,729,628 A | 3/1988 | Kraft et al. ................. 350/96.23 |
| 4,761,053 A | 8/1988 | Cogelia et al. ............. 350/96.23 |
| 4,776,664 A | 10/1988 | Okura ......................... 350/96.23 |
| 4,923,278 A * | 5/1990 | Kashyap et al. ............... 385/128 |
| 5,180,890 A | 1/1993 | Pendergrass et al. ......... 174/117 |
| 5,189,719 A | 2/1993 | Coleman et al. .............. 385/101 |
| 5,371,823 A | 12/1994 | Barrett et al. ................ 385/101 |
| 5,651,081 A | 7/1997 | Blew et al. ................... 385/101 |
| 5,778,652 A | 7/1998 | Kunze ............................ 57/235 |
| 6,188,821 B1 | 2/2001 | McAlpine et al. ............ 385/100 |
| 6,370,303 B1 | 4/2002 | Fitz et al. ..................... 385/113 |
| 6,400,873 B1 | 6/2002 | Gimblet et al. .............. 385/102 |
| 6,487,345 B1 | 11/2002 | Dixon et al. ................. 385/100 |
| 6,501,888 B2 | 12/2002 | Gimblet et al. .............. 385/113 |
| 6,529,663 B1 | 3/2003 | Parris et al. ................. 385/113 |
| 6,542,674 B1 | 4/2003 | Gimblet ....................... 385/113 |
| 6,546,175 B1 | 4/2003 | Wagman et al. ............. 385/113 |
| 6,563,990 B1 | 5/2003 | Hurley et al. ................ 385/101 |
| 6,577,797 B2 | 6/2003 | Quiroz ......................... 385/114 |
| 6,618,526 B2 | 9/2003 | Jackman et al. ............. 385/102 |
| 6,621,964 B2 | 9/2003 | Quinn et al. ................. 385/105 |

* cited by examiner

Primary Examiner—Javaid H. Nasri
(74) Attorney, Agent, or Firm—Michael E. Carroll, Jr.

(57) ABSTRACT

A fiber optic cable includes at least one optical waveguide, at least one strength member, and a jacket. The at least one strength member is a material having an average residual angle in the range of about 30 degrees to about 65 degrees during a bending test using a mandrel having a wire ratio (D/d) of about 200. The strength member is suitable, if necessary, for self-attaching to studs, hooks, or the like by bending it therearound and is also suitable for hardware such as P-clamps or other grips. In other embodiments, strength member 14 is annealed to relieve work hardening. Preferred embodiments use a steel strength member with a carbon content between about 0.30 percent to about 0.75 percent. Additionally, a coating may be applied to the strength member for environmental/corrosion protection or conductivity.

29 Claims, 3 Drawing Sheets

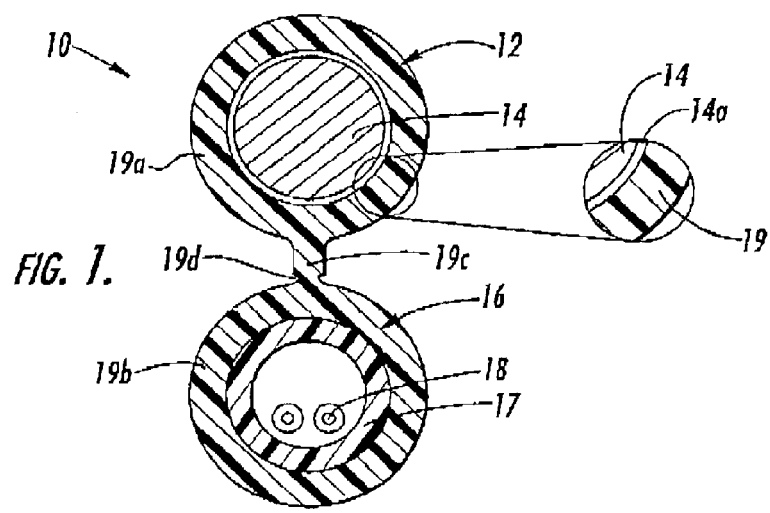
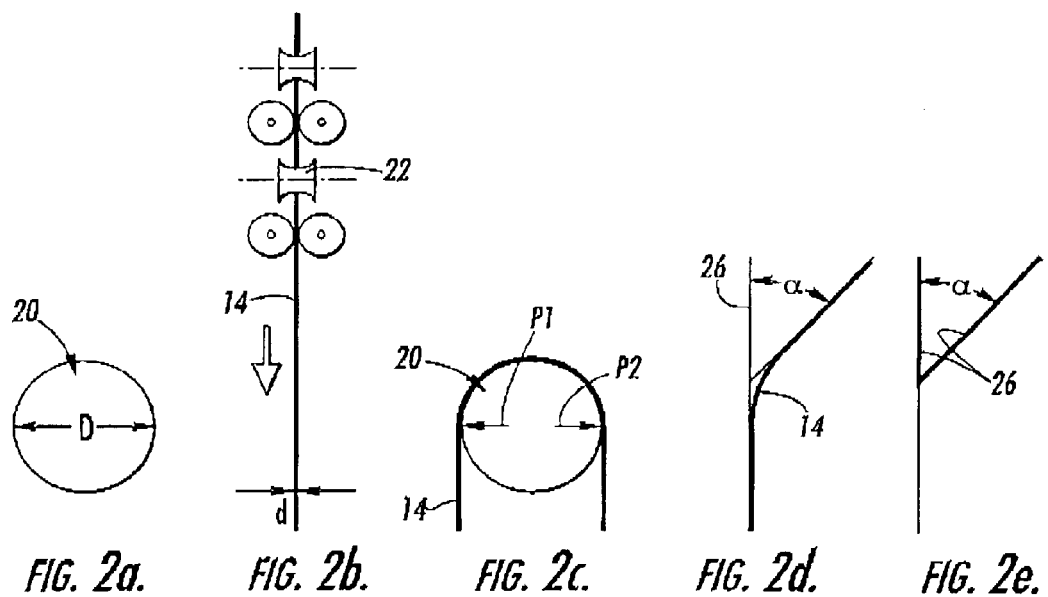

FIBER OPTIC CABLE HAVING A STRENGTH MEMBER

FIELD OF THE INVENTION

The present invention relates generally to fiber optical cables. More specifically, the invention relates to fiber optic cables having one or more strength members with given properties.

BACKGROUND OF THE INVENTION

Fiber optic cables include optical waveguides such as optical fibers that transmit optical signals, for example, voice, video, and/or data information. As businesses and households demand increased data capacity, fiber optic cables can eventually displace electrical voice, video, and data signal carriers. This demand will require low fiber count optical cables to be routed to end users, for example, businesses and households.

Fiber optic cables can typically be used in various applications. For example, fiber optic drop cables can be suitable for both aerial and buried cable applications. More specifically, a fiber optic drop cable can be strung between poles, strung between a pole and the premises, and/or buried in the ground before reaching the end user. Aerial and buried cable environments have unique requirements and considerations. Optical fiber drop cables should meet the unique requirements and considerations of intended environments, yet still remain cost effective and simple to manufacture.

Typically, aerial cable applications use a clamp such as a P-clamp to string drop cables from a main cable to a premise location. For instance, U.S. Pat. No. 4,467,138 discloses a drop cable being tensioned using P-clamps between a main cable located at a pole and the premise of a customer. Near the pole, the drop cable is inserted into the P-clamp for holding the tension on the cable and the P-clamp is secured to the pole using a J hook. At the pole, the communication elements and strength member of the drop cable are split apart for connection. Specifically, the communication elements are routed to an aerial closure for connection with the main cable and the strength member is routed to a separate clamp. Likewise, a similar P-clamp and J hook configuration is used for securing the drop cable at the premise end. As disclosed, the strength member is made from a copper clad steel wire for insertion in the P-clamp. This drop cable installation has disadvantages such as added expense of hardware such as the P-clamps and associated labor to install the same. Another disadvantage is that optical fibers must be protected from the clamping forces of the P-clamps. Therefore, the cable intended for use with P-clamps must be robust to absorb the clamping force on the fiber optic cable, which generally means more material.

SUMMARY OF THE INVENTION

The present invention is directed to a fiber optic cable including at least one optical waveguide, at least one strength member, and a jacket. The at least one strength member is a material having an average residual angle in the range of about 30 degrees to about 65 degrees during a bending test using a mandrel to wire ratio (D/d) of about 200.

The present invention is also directed to a fiber optic cable including a carrier portion having at least one optical waveguide, a messenger portion having at least one strength member, and a jacket. The at least one strength member being a steel with a carbon content in the range of about 0.30 percent to about 0.75 percent. The jacket forms part of a carrier jacket and part of a messenger jacket with a web of the jacket connecting the carrier jacket with the messenger jacket.

Additionally, the present invention is directed to a fiber optic cable having at least one optical waveguide, at least one strength member, and a jacket. The at least one strength member is a steel that is annealed for relieving stress induced in the manufacturing process.

BRIEF DESCRIPTION OF THE FIGS.

FIG. 1 is a cross-sectional view of a fiber optic cable according to the present invention.

FIG. 2 is a schematic representation of a bending test according to the present invention.

DETAILED DESCRIPTION OF THE INVENTION

Figure 3:
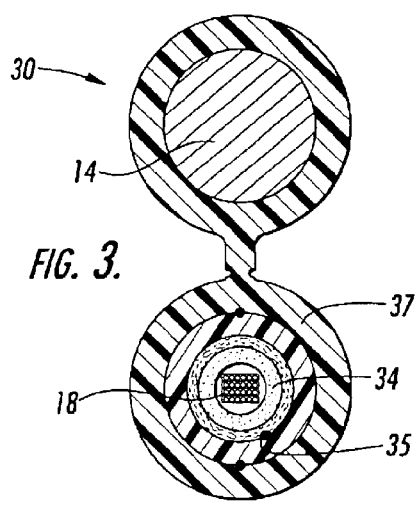
FIGS. 3–8 are cross-sectional views of other embodiments of a fiber optic cable according to the present invention.

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Illustrated in FIG. 1 is a fiber optic cable 10 according to one embodiment of the present invention. Fiber optic cable 10 (hereinafter cable) includes a messenger section 12 having at least one strength member 14, a carrier section 16 having at least one optical waveguide 18, and a jacket 19. Jacket 19 includes a part of a messenger jacket 19a and a part of a carrier jacket 19b connected by a web 19c in a figure eight design. In this case, strength member 14 is a solid metallic material such as steel having a relatively low bend energy and good memory shape so that it can be bent into a relatively tight radius so that it may function as a tie down. Thus, strength member 14 is suitable, if necessary, for self-attaching to studs, hooks, or the like without the added expense and labor of clamps and/or other hardware, yet it is still suitable for such hardware. In preferred embodiments, strength member 14 is annealed to relieve work hardening. More preferably, strength member 14 has a carbon content between about 0.30 percent to about 0.75 percent. In other embodiments, a coating 14a is applied to strength member 14. For instance, coating 14a include zinc-based or polymer coatings for environmental/corrosion protection, a copper coating for conductivity, but other suitable coating(s) may be useful.

Cables according to the present invention have strength members with a ductility so that the strength member is easily and securely formed around a peg or tie-down point by, for example, a craftsman without using tools. On the other hand, conventional strength members used in prior art cables are not suitable for this task. For instance, high-carbon steels such as 1082 were used because they are relatively stiff after the drawing process, i.e., the steel is work hardened. The high-carbon steel was used because it has a relatively high yield strain due to hardening and requires a relatively large force for a significant plastic elongation. Moreover, the high-carbon steel is relatively stiff and inhibits bending the cable into in a relatively small bend radius, thereby inhibiting bending stress from being applied to the optical fiber in the cable and preserving optical performance. Consequently, the high-carbon conventional strength members are suitable for use with clamps such as P-clamps, but are difficult to bend because they require a high bend energy to form.

Other conventional strength members used steels having a relatively low-carbon content such as a 1026 steel. Unlike the high-carbon steel, the low-carbon steel retains its shape after bending. Although, the low-carbon steel can easily be bent it has a relatively low yield strain. This relatively low yield strain makes the low-carbon steel less desirable for aerial application because when subject to loads such as heavy ice or wind it can have a relatively large plastic deformation. This plastic deformation can cause optical performance issues over the life of the cable.

A test was performed for quantifying suitable performance characteristics for the cable strength member 14 according to the present invention. Specifically, as shown in FIGS. 2a–e bending test was designed for measuring suitable strength member performance. As used herein, the bending test is defined as selecting a mandrel 20 (FIG. 2a) with an outer diameter D that is about 200 times ± about 10 percent the diameter d of the strength member to be tested. Selecting a mandrel using this ratio subjects the strength member to a maximum bend surface strain of about 0.5%. Mandrel 20 is then marked at its periphery at two points P1, P2 that are 180 degrees apart. Next, the strength member for testing is straightened using a wire straightener 22 such as a Witels Albert model WR31 as shown schematically in FIG. 2b. Thereafter, a portion of the strength member is bent about mandrel 20 under essentially no tension so that the tangent contact points of the strength member are in-line with point P1, P2 as shown in FIG. 2c, i.e., 180 degree bend. In other words, the two ends of the strength member are parallel with each other. After removing the bending force, the strength member springs back to a relaxed position as shown in FIG. 2d. The strength member is placed on a flat surface and a pair of straight edges 26 are aligned with the straight legs of the strength member for determining a residual angle a induced in the strength member due to the bending test. Finally, the residual angle a between the straight edges is measured as shown in FIG. 2e.

A first bending test was performed on three steel samples each having a diameter of 1.9 mm. The first two samples were a low-carbon steel and a high-carbon steel. More specifically, the steels were respectively a 1026 steel and a 1082 steel indicating respective carbon content of 0.26 percent and 0.82 percent. The third sample was a 1055 steel having a carbon content of 0.55 percent that was stress relieved, i.e., annealed for relieving work hardening. Additionally, the 1055 steel was galvanized for environmental protection. The 1055 steel is commercially available from Solon Specialty Wire of Salon, Ohio under the tradename 7M0037. For this first bending test, mandrel 20 had an outer diameter of 340 mm. For the 340 mm mandrel and a 1.9 mm strength member the mandrel to wire ratio (D/d) was calculated as about 180. Two trials for the first bending test were performed and an average residual angle was calculated along with an average percentage of the bend retained. The average percentage of the bend retained was calculated by dividing the average residual angle by 180 degrees which was the bending angle. The results are summarized in Table 1.

TABLE 1

| | (D/d about 180) | | | |
|---|---|---|---|---|
| Sample | Trial #1 | Trial #2 | Average Residual Angle | Percentage of the bend retained |
| 1026 | 68° | 72° | 70° | 39% |
| 1082 | 29° | 20° | 24.5° | 14% |
| 1055 | 55° | 58° | 56.5° | 31% |

The three samples were also tested in a similar manner in a second bending test. For the second bending test, mandrel 20 had an outer diameter D of about 420 mm, thereby yielding a mandrel to wire ratio (D/d) of about 220. The results are summarized in Table 2.

TABLE 2

| | (D/d about 220) | | | |
|---|---|---|---|---|
| Sample | Trial #1 | Trial #2 | Average Residual Angle | Percentage of the bend retained |
| 1026 | 63° | 70° | 66.5° | 37% |
| 1082 | 26° | 21° | 23.5° | 13% |
| 1055 | 55° | 50° | 52.5° | 29% |

The bending test shows that the 1026 sample has relatively high residual angles after inducing the 180 degree bend. Expressed as a percentage, the 1026 sample respectively retains about 39 and 37 percent of the applied 180 degree bend for the two bending tests. By interpolation, a mandrel to wire ratio (D/d) of about 200 should yield a retained bend of about 38 percent for a bend angle of 180 degrees using a 1026 sample. While the 1026 sample may be wrapped about an attachment point, the relatively low yield point indicated by the high residual angle is an indication that there would be too much plastic elongation during the life of the cable. In other words, environmental loading such as heavy ice or wind loads can cause the low-carbon steel to plastically elongate, thereby allowing the transfer of the load to the optical waveguide and unacceptable performance over the life of the cable.

On the other hand, the 1082 sample was stiff and relatively difficult to form into tight loops because it requires a relatively high bend energy to form during the bending test. As results show, the high-carbon 1082 samples have relatively low residual angles after bending for both bending tests. In others words, after the 1026 sample was tested it had a relatively small plastic deformation. Expressed as a percentage, the 1082 sample respectively retained about 14 and 13 percent of the applied 180 degree bend for the two bending tests. Since the 1082 sample is relatively stiff and requires a high bend energy, wrapping it about a J-hook or other attachment point would be difficult.

On the other hand, the 1055 sample has residual angles for the bending test that fall between the values for the 1026 and 1082 samples. Consequently, the 1055 sample is suitable for tie-down, for example, by hand because it can be bent into a relatively tight radius and hold its shape. Preferably, the present invention, among other things, uses stress relieved steel for strength member 14 of the fiber optic cable that reduces the residual stresses induced during the wire drawing process, thereby making it relatively easy to form by hand. Additionally, the steel of strength member 14 may have a carbon content between about 0.3 percent and about 0.75 percent. During the bending test using a D/d ratio of about 200 strength members 14 of the present invention have an average residual angle in the range of about 30 degrees to about 65 degrees, and more preferably in the range of about 35 degrees to about 60 degrees. Likewise, strength members 14 of the present invention have an average percentage of the bend retained in the range of about 15 percent to about 35 percent, and more preferably in the range of about 20 percent to about 35 percent.

Additionally, other strength members 14 besides steel are contemplated within the present invention if suitable ranges of the average residual angles and/or suitable ranges of average percentages of bend retained. Such suitable materials include polyoxymethylene (POM) also known as polytriozane or polyformaldehyde, or other like materials having the desired characteristics.

Carrier section 16 of cable 10 includes at least one optical waveguide 18, which in this case is a single-mode optical fiber that is tight-buffered (not numbered) as is known in the art. However, the concepts of the present invention can use other types and/or configurations of optical waveguide 18. For example, optical waveguide 18 can be multi-mode, erbium doped, polarization-maintaining fiber, or other suitable type of light waveguide. Optical waveguide 18 may also have other configurations such as loose, bundled, or ribbonized. Additionally, a cable can include more than one ribbon in a ribbon stack without stranding or with helical or S–Z standing. Each optical waveguide 18 may include a silica-based core that is operative to transmit light and is surrounded by a silica-based cladding having a lower index of refraction than the core. Additionally, one or more coatings can be applied to optical waveguide 18. For example, a soft primary coating surrounds the cladding, and a relatively rigid secondary coating surrounds the primary coating. Optical waveguide 18 can also include an identifying means such as ink or other suitable indicia for identification. Suitable optical fibers are commercially available from Corning Incorporated of Corning, N.Y. Additionally, optical waveguide 18 can have an excess fiber length with respect to the carrier section for reducing the amount of strain the optical waveguide experiences. Specifically, cable 10, or other cables of the present invention, can include an excess fiber length of optical waveguide 18 as discussed in U.S. Pat. No. 6,546,175, the disclosure of which is incorporated herein by reference.

In this embodiment, optical waveguides 18 are disposed within a tube 17 that is made from a polymeric material. Moreover, tube 17 along with other components of the cable can be formed from flame-retardant polymeric materials, thereby improving flame-retardant properties of the cable. Buffer tube 17 may either be filled with a thixotropic material or be a dry design that excludes thixotropic materials used for filling the tube. However, dry design can include lubricants on optical waveguides 18. Suitable lubricants include oils having additives, powders, or like materials.

Jacket 19 is preferably a polymeric material that is extruded about strength member 14 and tube 17, thereby forming a part of a messenger jacket 19a and a part of a carrier jacket 19b connected by a web 19c. Web 19c can be continuous or have windows as disclosed in U.S. Pat. No. 6,546,175, the disclosure of which is incorporated herein by reference. Additionally, the carrier section 16 can have an over-length with respect to the messenger section 12 of cable 10. Web 19c can also include a preferential tear portion 19d for aiding in the separation of messenger section 12 and carrier section 16. Preferably, messenger section 12 is about the same size as carrier section 16; however, the section may be different sizes.

In other advantageous embodiments, jacket 19 is a polymeric material that includes a suitable filling material for reducing the post-extrusion shrinkage of the jacket. A filled material is useful because after carrier section 16 is separated from messenger section 12 it has a tendency to shrink. If the carrier section 16 shrinks too much it may cause undesirable optical attenuation. The use of a filling material in the polymeric material can reduce the shinkage experienced after separation. Suitable fillers include glass, clay, talc and other like materials for reducing costs and/or shrinkage. Furthermore, jacket 19 may be formed from a flame-retardant polymeric material.

Figure 4:
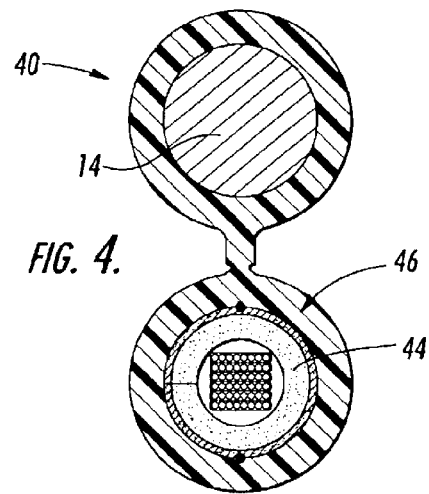

Dry designs of the present invention include one or more water-swellable tapes, yarns, powders, coatings, or components inside tube 17 for blocking water migration. For example, buffer tube 17 can include a dry insert as disclosed in U.S. patent application No. 10/326,022, the disclosure of which is incorporated herein by reference. FIG. 3 depicts cable 30 that includes a dry insert 34 inside a tube 37. Dry insert 34 includes one or more layers, and in preferred embodiments dry insert 34 includes a foam layer and a water-swellable layer. Dry insert 34 surrounds at least one optical waveguide 18 and may be secured by at least one binder. The foam layer of dry-insert 34 is preferably a compressible tape that assists in coupling the at least one optical fiber with tube 37. Additionally, a meltable binder 35 as disclosed in U.S. patent application Ser. No. 10/448,874 filed on May 30, 2003 titled "Fiber Optic Cable Having a Binder," along with other optional means, can assist coupling a portion of dry insert 34 with tube 37. For example, other optional means for coupling can include adhesives, glues, elastomers, and/or polymers that are disposed on at least a portion of the surface of dry insert 34 that contacts tube 37. However, the binder may have a tailored degree of friction with tube 37 so that an optional means of coupling is not necessary. FIG. 4 depicts cable 40 that is a tubeless embodiment according to the present invention. Cable 40 uses a dry insert 44 inside a carrier portion 46 of cable 40.

Figure 5:
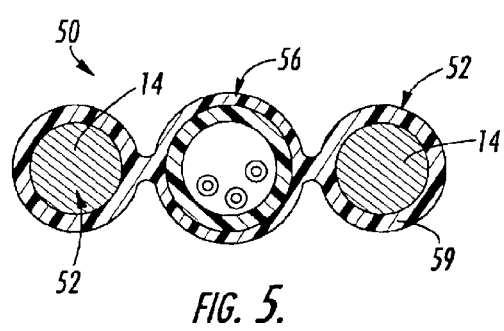
Figure 6:
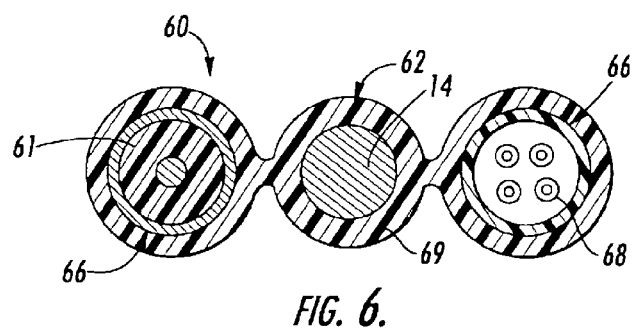
Figure 7:
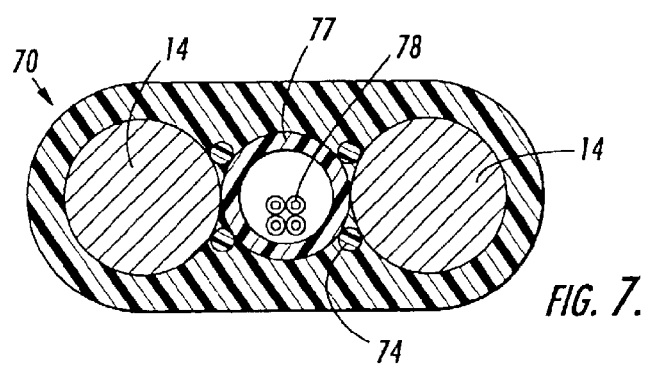

The concepts of the present invention can also be used with other cable configurations. For instance, cables according to the present invention can have more than two sections as shown in FIGS. 5 and 6. FIG. 5 depicts a cable 50 having two messenger sections 52 disposed at outboard locations and a carrier section 56 therebetween connected together by jacket 59. Carrier section 56 includes at least one optical waveguide, but may also include suitable electrical components such as a coaxial cable or a twisted pair. On the other hand, FIG. 6 depicts a cable 60 having a single messenger section 62 disposed between two carrier sections 66 and connected together by a jacket 69. At least one of carrier sections 66 includes an optical waveguide 68 and the other carrier section can have optical waveguides and/or suitable electrical components. As shown, cable 60 includes a coaxial cable 61 as one of the carrier sections. Other embodiments are also possible, for example, cable 60, as well as other cables, can be a tubeless design. Still another configuration is shown in FIG. 7. Specifically, FIG. 7 depicts cable 70 having at least one optical waveguide 78 disposed within a tube 77, at least one strength component 74, and at least one strength member 14 according to the present invention. The use of strength member 14 and strength component 74 such as an aramid fiber allows cable to provide the necessary tensile and anti-buckling strength, while still remaining relatively flexible. Cable 70 is generally flat but can have other shapes or configurations as well.

Additionally, the cables can have empty tubes or passageways so that optical waveguides may be blown-in into the cable at a later date.

Figure 8:
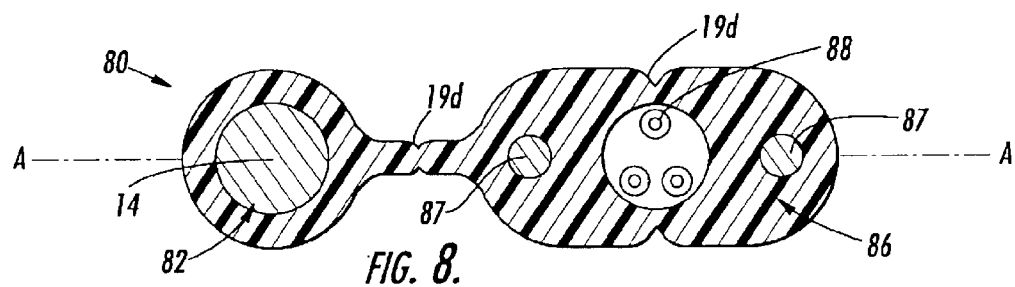

FIG. 8 shows still another novel cable 80 according the present invention. Cable 80 includes at least one strength member 14 in a messenger section 82 and a carrier section 86. In this cable, carrier section is a tubeless configuration having tight-buffered optical waveguides 88 in a passageway of the jacket. Additionally, cable 80 has a plurality of preferential tear portions 19d. Specifically, the first preferential tear portion is useful for easily and cleanly separating messenger section 82 from carrier section 86. The second preferential tear portion is useful for opening the jacket of the carrier section for accessing optical fibers 88 therein.

Furthermore, carrier section includes anti-buckling members 87 made from, for example, low-carbon steel having tensile strength. In addition to providing strength, anti-shrink members 87 inhibit the jacket of carrier section 86 from shrinking after being separated from messenger section 82. Anti-shrink/strength members 87 are generally arranged as discussed in U.S. Pat. No. 6,356,690, the disclosure of which is incorporated herein by reference. Specifically, cable 80 includes messenger section 82 and carrier section 86 connected by the web portion. Carrier section 86 includes at least one optical waveguide 88 and at least one strength member 87 that lies in a reference plane A—A that generally extends through the messenger section, the carrier section, and the web. Likewise, other embodiments of the present invention such as cables 30 and 40 can include anti-shrink members.

Many modifications and other embodiments of the present invention, within the scope of the appended claims, will become apparent to a skilled artisan. For example, any suitable cable designs can use the concepts of the present invention such as cables having multiple jackets, or other suitable cable designs. Additionally, cables of the present invention can include other suitable components such as ripcords, filler rod, tapes, films, or armor therein. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical fibers, but the inventive concepts of the present invention are applicable to other suitable optical waveguides and/or cable configurations as well.

What is claimed is:

1. A fiber optic cable comprising:
at least one optical waveguide;
at least one strength member, the at least one strength member is a material having an average residual angle in the range of about 30 degrees to about 65 degrees during a bending test using a mandrel to wire ratio (D/d) of about 200; and
a jacket.

2. The fiber optic cable of claim 1, the average residual angle being in the range of about 35 degrees to about 60 degrees.

3. The fiber optic cable of claim 1, the at least one strength member having a carbon content in the range of about 0.30 percent to about 0.75 percent.

4. The fiber optic cable of claim 1, the at least one strength member having an average percentage of the bend retained in the range of about 15 percent to about 35 percent during a bending test using a mandrel to wire ratio (D/d) of about 200.

5. The fiber optic cable of claim 1, the at least one strength member being annealed to reduce work hardening of the at least one strength member.

6. The fiber optic cable of claim 1, the at least one strength member having a coating.

7. The fiber optic cable of claim 1, the fiber optic cable being a figure eight cable having a messenger portion and a carrier portion connected by a web.

8. The fiber optic cable of claim 6, the web having a preferential tear portion.

9. The fiber optic cable of claim 1, the at least one optical waveguide being selected from the group of a tight-buffered optical fiber, an optical ribbon, and a bundle of optical fibers.

10. The fiber optic cable of claim 1, the jacket being a material having fillers.

11. The fiber optic cable of claim 1, the cable being a dry design.

12. A fiber optic cable comprising:
a carrier portion, the carrier portion having at least one optical waveguide;
a messenger portion, the messenger portion having at least one strength member, the at least one strength member being a steel with a carbon content in the range of about 0.30 percent to about 0.75 percent; and
a jacket, the jacket forms part of a carrier packet and part of a messenger jacket, and a web of the jacket connects the carrier jacket with the messenger jacket.

13. The fiber optic cable of claim 12, further comprising a second carrier section having at least one optical waveguide.

14. The fiber optic cable of claim 12, further comprising a second messenger section having at least one strength member.

15. The fiber optic cable of claim 12, the at least one strength member having an average residual angle in the range of about 30 degrees to about 65 degrees during a bending test using a mandrel to wire ratio (D/d) of about 200.

16. The fiber optic cable of claim 12, the at least one strength member having an average residual angle in the range of about 35 degrees to about 60 degrees during a bending test using a mandrel to wire ratio (D/d) of about 200.

17. The fiber optic cable of claim 12, the at least one strength member being annealed to reduce work hardening of the at least one strength member.

18. The fiber optic cable of claim 12, the at least one strength member having a coating.

19. The fiber optic cable of claim 12, the web of the jacket having a preferential tear portion.

20. The fiber optic cable of claim 12, the at least one optical waveguide being selected from the group of a tight-buffered optical fiber, an optical ribbon, and a bundle of optical fibers.

21. The fiber optic cable of claim 12, the jacket being a material having filled materials.

22. The fiber optic cable of claim 12, the cable being a dry design.

23. The fiber optic cable of claim 12, the at least one strength member having an average percentage of the bend retained in the range of about 15 percent to about 35 percent during a bending test using a mandrel to wire ratio (D/d) of about 200.

24. A fiber optic cable comprising:
at least one optical waveguide;
at least one strength member, the at least one strength member being a steel that is annealed for relieving stress induced in the manufacturing process, the at least one strength member having a carbon content in the range of about 0.30 percent to about 0.75 percent; and a jacket.

25. The fiber optic cable of claim 24, the cable being a dry design.

26. The fiber optic cable of claim 24, the jacket being formed from a polymeric material having fillers for reducing post-extrusion shrinkage.

27. The fiber optic cable of claim 24, the at least one strength member having a coating.

28. The fiber optic cable of claim 24, the at least one strength member having an average residual angle in the range of about 30 degrees to about 65 degrees during a bending test using a mandrel to wire ratio (D/d) of about 200.

29. The fiber optic cable of claim 24, the at least one strength member having an average residual angle in the range of about 35 degrees to about 60 degrees during a bending test using a mandrel to wire ratio (D/d) of about 200.

* * * * *